June 9, 1936.  J. D. ROVICK  2,043,596
BROACHING MACHINE
Filed May 8, 1933   2 Sheets-Sheet 2

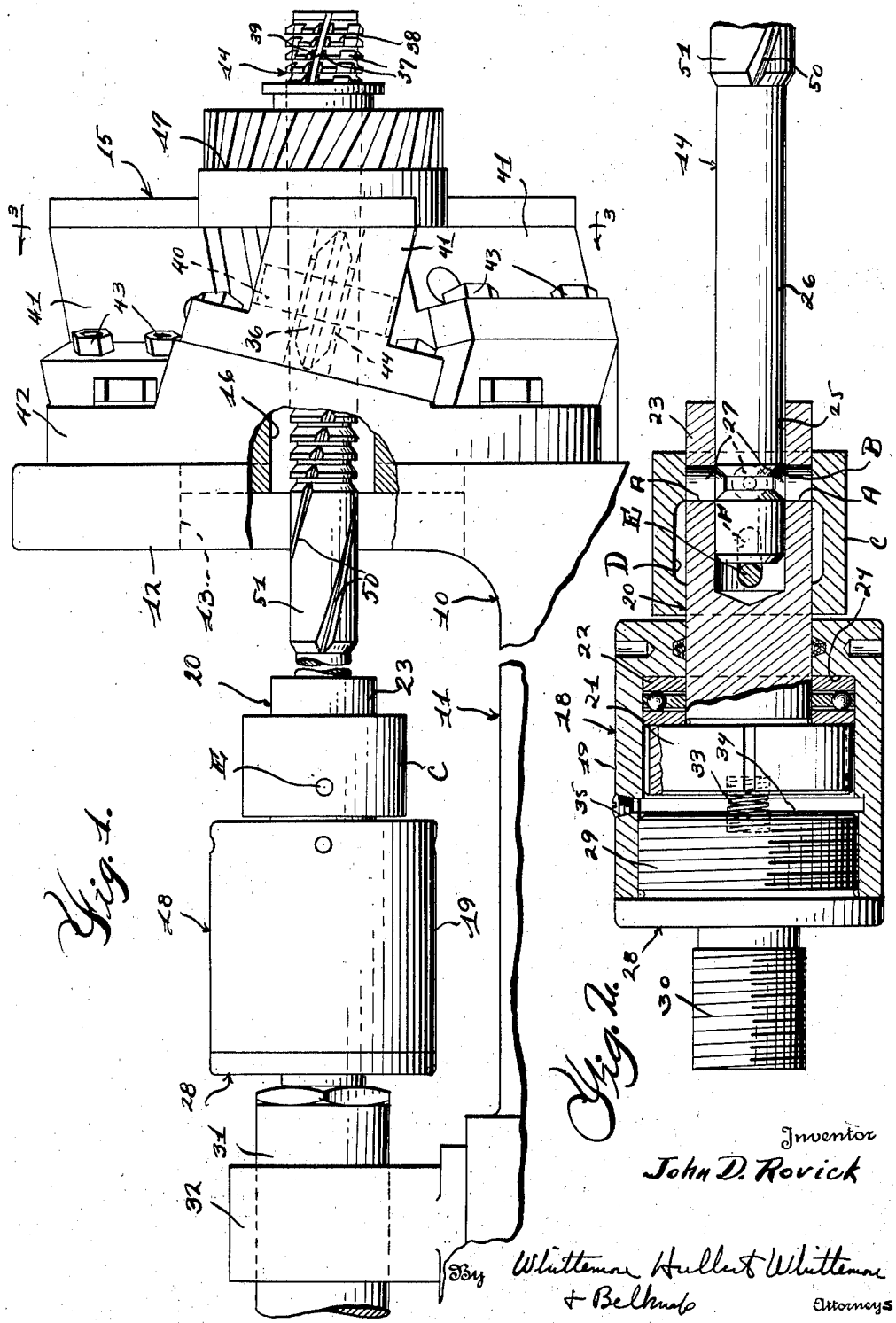

Inventor
John D. Rovick
By Whittemore Hulbert Whittemore
& Belknap   Attorneys

Patented June 9, 1936

2,043,596

UNITED STATES PATENT OFFICE 2,043,596

BROACHING MACHINE

John D. Rovick, Detroit, Mich., assignor to National Broach & Machine Company, Detroit, Mich., a corporation of Michigan Application May 8, 1933, Serial No. 670,019

2 Claims. (Cl. 90—33)

This invention relates generally to broaching machines and refers more particularly to apparatus for forming spiral grooves in the internal annular surfaces of openings formed in various articles of manufacture such as gears or bushings and the like.

In the manufacture of variable speed helical gear transmissions, it has been proposed to actually shift the helical gears into mesh by forming a helical spline on the transmission shaft and a corresponding helical groove on the hub of the gear for engaging the spline. In order to preserve the quiet operating characteristics of helical gear transmissions of the foregoing type and at the same time insure substantially effortless shifting of the gears into mesh, it is essential that the cooperating interengaging helical portions of the transmission shaft and gears slidably mounted thereon be accurately formed to predetermined dimensions. To accurately form a helical spline on the transmission shaft is a fairly simple matter as compared to the difficulty of forming helical grooves in the gears for receiving the aforesaid splines in such a manner as to afford easy shifting of the gears axially of the shaft as well as noiseless operation, and to this end the present invention contemplates apparatus capable of accomplishing the foregoing results on a production basis with the minimum power consumption.

The present invention provides for accurately forming a helical groove in the hub of the gear to predetermined dimensions by a broaching machine embodying guide means for the broach supported in close proximity to the work or gear and operable upon longitudinal movement thereof to impart a rotative movement thereto in such a manner that the cutting teeth on the broach are accurately guided in a spiral path with respect to the gear or work.

Another feature of this invention which contributes materially to the accuracy of the spiral groove in the work resides in the provision of spiralled guide means on the broach for engaging guide means supported on the machine frame symmetrical with respect to the broach and immediately adjacent the work to be grooved by the latter.

A further feature of the present invention resides in the provision of a broach having spiralled teeth and correspondingly spiralled grooves in the lands between the teeth for engaging cooperating guide means supported upon the machine frame in symmetrical relation to the broach.

A still further advantageous feature of the present invention resides in the provision of guide means on the machine frame in the form of a plurality of guides symmetrically arranged with respect to the broach and extending between spiralled teeth on the broach in such a manner as to accurately guide the latter in a spiral path with respect to the work.

Still another object of the present invention resides in the provision of guide means on the frame in the form of a plurality of rollers symmetrically arranged with respect to the broach and engageable with spiralled guide means on the latter for the purpose specified in the preceding paragraph. This latter construction, aside from accurately guiding the broach in a spiral path with respect to the work, also serves to materially reduce friction, and thereby effects a saving in the power required to operate the broach.

In addition to the foregoing, the present invention contemplates the provision of a broach having spirally arranged cutting teeth and having a correspondingly spiralled guide extending beyond the cutting teeth of the broach a distance sufficiently greater than the width of the work to permit engagement thereof with the guide means supported on the machine frame. The portion of the broach referred to above as extending beyond the teeth functions as a pilot for the broach and insures revolving of the broach prior to engagement of the cutting teeth with the work.

Although in the previous discussion of some of the advantages of the present invention particular stress has been placed upon the use of the broaching machine for forming spiralled grooves in the hub portions of helical gears of the type commonly employed in variable speed transmissions, nevertheless, it is to be understood that this illustration is merely given as an example of the extreme accuracy that can be obtained with the present invention, and as this description proceeds, it will be apparent that the broaching machine may be used with equal facility in connection with any particular article of manufacture where it is desirable to form a spiralled groove therein.

The foregoing as well as other objects will be made more apparent in the detailed description of the specific embodiment of this invention illustrated in the accompanying drawings, wherein:

Figure 1 is a side elevational view of the machine embodying this invention;

Figure 2 is an enlarged longitudinal sectional view through the broach actuating means;

Figure 3:
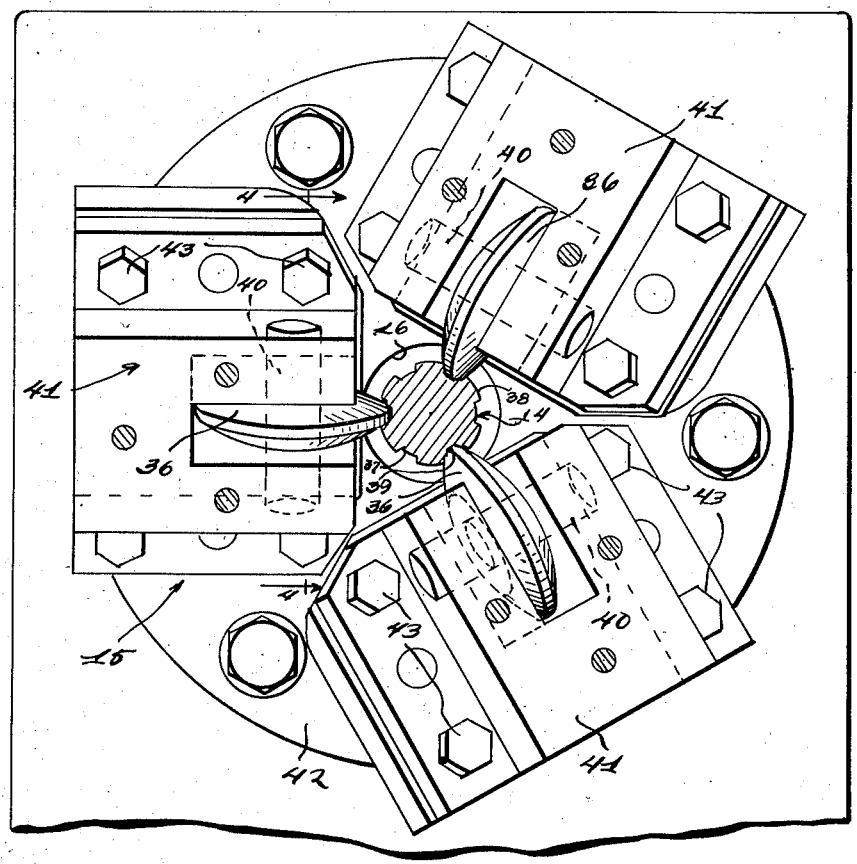
Figure 3 is a transverse sectional view taken on the line 3—3 of Figure 1.

Referring now to the drawings, it will be noted that there is illustrated in Figure 1 a broaching machine 10 having a frame 11 comprising an upright portion 12 formed with an opening 13 therein for the passage therethrough of a broach 14. Fixed to the front side of the upright portion 12 is a guiding fixture 15 for the broach having an opening 16 therethrough in alignment with the opening 13 for the passage of the broach and having a plane surface 17 at the front side thereof forming an abutment for the part to be broached.

The broach 14 is drawn through the guiding fixture 15 and adjacent part 12 of the frame 11 by means of a puller 18 having a head 19 open at the rear end thereof for receiving a coupling member 20. The coupling member is provided with an enlarged portion 21 at the rear end thereof and is held within the head 19 by means of a thrust bearing 22 encircling the reduced portion 23 of the coupling between the enlarged portion 21 thereof and front wall 24 of the head. The reduced portion 23 of the coupling extends forwardly through a suitable opening formed in the front wall 24 of the head and is counterbored as at 25 for receiving the rear end of the reduced portion or shank 26 of the broach 14. The shank of the broach is held in assembled relation with the reduced portion 23 of the coupling by means of a plurality of symmetrically arranged plungers 27 mounted for radial sliding movement in openings A formed in the counterbored portion of the coupling and terminating at the inner ends in cam portions substantially V-shaped in cross section for engaging in a correspondingly formed annular groove B fashioned in the reduced end portion of the broach 14. The plungers 27 are normally held in their innermost position by means of a sleeve C slidably mounted on the coupling and having an annular internal recess D intermediate the ends movable in registration with the plungers to permit sufficient outward movement thereof to disengage the inner ends from the groove in the broach. The sleeve C is held in assembled relation with the coupling by means of a pin E projecting inwardly from the sleeve and engageable within a slot F in the coupling elongated to provide for the necessary axial movement of the sleeve. The rear end of the head 19, on the other hand, is normally closed by means of a coupling 28 having a forwardly extending portion 29 threaded within the rear end of the head 19 and having a rearwardly extending portion 30 threadedly secured to the pull bar 31 which in turn is slidably supported upon the frame of the machine through the medium of a bearing 32. Interposed between the enlarged portions 21 and 29 of the couplings 20 and 28, respectively, is a suitable coil spring 33 for normally maintaining a space 34 in the head between the aforesaid enlarged portions. The space 34 may be filled with a suitable lubricant through a filler opening 35 in the head communicating therewith so that upon reciprocation of the head, lubricant from the space 34 will be supplied to the thrust bearing 22.

As hereinbefore stated, much of the commercial success of the machine for forming spiralled grooves in the work to accurate predetermined dimensions is attributed to the novel means provided for guiding the broach during its travel through the work. In the present instance, the work is held against the plane surface 17 from rotation by the action of the broach passing therethrough, and means is associated with the guiding fixture 15 for engaging cooperating means upon the broach to not only impart a rotative movement of the broach as the same is pulled through the work, but to also accurately guide the cutting teeth on the broach in a spiral path with respect to the work. In the specific embodiment of the invention, the means for rotating the broach and guiding the cutting teeth thereof in a predetermined spiral path comprises a plurality of rollers 36 symmetrically arranged with respect to the broach. As shown particularly in Figure 1, the rollers are supported in a position within the fixture 15 as close to the work or to the application of the load on the broach as is possible so as to prevent twisting of the broach between the load point and guiding rollers. The guide rolls, in addition to being positioned in close proximity to the work as specified above, are also accurately located in the fixture with respect to the lands 37 between the spirally extending teeth 38 on the broach, and the peripheral portions of the rollers engage in grooves 39 formed in the lands 37 of the broach. The grooves 39 are formed on a spiral corresponding to the spiral of the adjacent teeth on the broach, and the side walls thereof are tapered outwardly with respect to the axis of the broach. The opposite sides of each of the guide rollers are correspondingly tapered so as to accurately fit within the grooves, and thereby insure movement of the broach throughout a predetermined path of travel established by the grooves 39. The number of the lands 37 on the broach grooved for the purpose specified above depends entirely upon the number of guide rolls employed, and the spacing of the rollers circumferentially of the broach is controlled by the design of the broach or by the spacing of the lands on the broach. Although the particular design of broach controls to a certain extent the spacing of the guide rolls, nevertheless, it is preferable to space the rolls equal distances circumferentially of the broach where the design of the latter permits. In the specific illustrative embodiment of the invention, particularly satisfactory results are secured by providing three guide rolls, and since the particular design of the broach shown herein permits the rolls to be spaced equal distances from each other circumferentially of the broach, I have shown the same as supported in this relationship in the fixture. By providing a plurality of rollers in the manner specified above for guiding the broach, the thrust is always against one side of each roller, and any uniform wear occurring on these parts will not affect the efficient operation of the broach as the twist of the latter will take up the wear until the guide means associated therewith abuts against two or more of the guide rollers.

Figure 4:
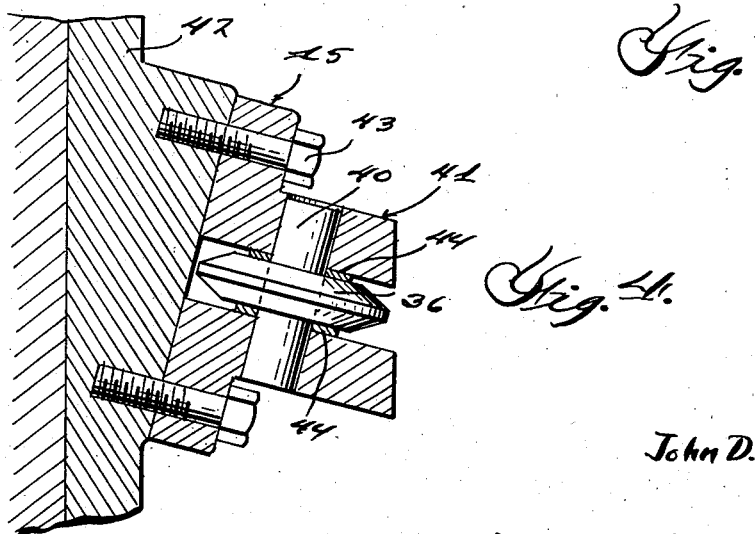
Figure 4 is a sectional view taken on the line 4—4 of Figure 3.

The guiding rollers 36 are mounted upon shafts 40 having the opposite ends thereof journaled in suitable brackets 41 which in turn are removably secured to the face plate 42 of the fixture by means of stud bolts 43. As shown particularly in Figure 4, the rollers 36 are interposed between the brackets 41 and together with the shafts 40 are prevented from axial displacement by means of suitable spacers 44 interposed between opposite sides of the rollers and the adjacent surfaces of the brackets 41. It will also be observed from Figure 4 that the surfaces of the face plate 42 upon which the brackets 41 are secured are angularly disposed so as to position the rollers 36 in proper relation to the grooves 39 formed in the broach.

Referring now to the operation of the broaching machine and assuming that it is desired to form a spiralled groove in the hub of a gear or other article of manufacture, the latter is placed against the plane surface 17 of the fixture 15 in the manner shown in Figure 1 whereupon the reduced shank portion 26 of the broach is extended through the opening in the work to the puller 18. Upon extending the shank portion of the broach into the puller, the guide rollers 36 are engaged in spiralled grooves 50 formed in the pilot 51 of the broach and forming a continuation of the grooves 39 between the cutting teeth on the broach. After the shank portion 26 has been secured to the puller in the manner previously set forth, the latter is actuated to move the broach axially rearwardly with respect to the work. Inasmuch as the guide rollers 36 are in engagement with the grooves 50 formed in the pilot 51 of the broach, and in view of the fact that the grooves 50 form a continuation of the grooves 39 specified above, it will be noted that axial travel of the broach relative to the rollers will impart a rotative movement to the broach so as to accurately guide the cutting teeth in a predetermined spiral path upon engagement of the teeth with the work. Continued movement of the broach in the aforesaid direction causes the teeth on the broach to pass through the work whereupon the rollers engage within the grooves 36 formed in the lands of the broach between the teeth. With this construction it will be apparent that the teeth on the broach are accurately guided in a predetermined spiral path with respect to the work throughout the entire operative stroke of the broach, and, consequently, the resulting spiralled groove in the work will be correspondingly accurately formed.

While in describing the present invention particular stress has been placed upon accurately guiding the teeth in a spiral path by forming correspondingly spiralled grooves in the lands between adjacent teeth for engagement with cooperating guide means on the frame, it is to be noted that the teeth may also be guided by engaging the means on the frame with the adjacent side walls of the cutting teeth in which event the grooves may be omitted. The foregoing is just an example of the numerous modifications that may be resorted to for accomplishing the results set forth herein, and, accordingly, reservation is made to make such changes as may come within the purview of the accompanying claims.

What I claim as my invention is:

1. A broaching machine comprising a frame, a rotatably mounted broach having spirally arranged cutting teeth and having three or more correspondingly spirally extending grooves in the lands thereof between certain of said teeth, means for moving said broach axially with respect to said frame, means for non-rotatably positioning an article to be broached relative to said broach for engagement thereby, and a plurality of roller guides symmetrically arranged with respect to said broach and engaging in said grooves for accurately guiding the teeth of said broach in a predetermined spiral path with respect to the article upon axial movement of the broach said roller guides being between said article and said moving means and closely axially spaced from said article-positioning means.

2. A broaching machine comprising a frame, a non-rotatable article holder on said frame for supporting an apertured article to be spirally broached, a broach-pulling mechanism, a broach rotatably connected to said pulling mechanism, said broach having spiraled teeth thereon and having three or more spiral grooves between adjacent teeth and extending axially between the first of said teeth and said pulling mechanism, three or more rollers symmetrically disposed about said broach and engaging the respective grooves in said broach and means for non-rotatably securing said rollers to said frame between said pulling mechanism and said article holder and in such close axial proximity to the work as to eliminate any tendency for the portion of the broach between the work and said guiding rollers to twist during the broaching operation.

JOHN D. ROVICK.